Feb. 3, 1970     J. GIRDWOOD     3,493,863

PORTABLE BATTERY TESTER

Original Filed May 8, 1964

INVENTOR.
JAMES GIRDWOOD

BY

ATTORNEY

United States Patent Office 3,493,863
Patented Feb. 3, 1970

3,493,863
PORTABLE BATTERY TESTER
James Girdwood, Zionsville, Ind., assignor to P. R. Mallory & Co., Inc., Indianapolis, Ind., a corporation of Indiana
Continuation of application Ser. No. 366,079, May 8, 1964. This application Nov. 20, 1968, Ser. No. 778,024
Int. Cl. G01t 1/20
U.S. Cl. 324—145                        6 Claims

ABSTRACT OF THE DISCLOSURE

A portable apparatus for indicating the voltage of a battery. The apparatus includes an insulative case, a holder for retaining the battery, a displaceable probe for contacting the battery and connected to a coil, and a permanent magnet positioned within the coil and connected to a pointer so that current flow from the battery through the coil deflects the permanent magnet and coil proportional to the current flowing from the battery through the coil.

---

This is a continuation of application Ser. No. 366,079, filed May 8, 1964.

The present invention relates to means for evaluating electric reactive devices and more specifically a means for evaluating batteries.

It is known in the art to provide means for evaluating electric devices such as batteries, however, the present art does not provide a satisfactory, economical means for testing electric devices such as the miniature batteries used in hearing aids.

The present invention provides a small, economical portable means for testing devices such as the miniature batteries used in hearing aids. This invention may be carried in a woman's purse, stored in a dresser drawer, etc., is easily operated and is economical.

It is an object of the present invention to provide a means for evaluating miniature electric devices such as hearing aid batteries.

It is a further object of the present invention to provide an economical means for evaluating miniature electric devices such as hearing aid batteries.

It is a further object of the present invention to provide a simple and economical means for evaluating miniature electric devices such as hearing aid batteries.

The present invention in another of its aspects relates to novel features of the instrumentalities of the invention described herein for teaching the principal object of the invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims, and appended drawings.

The appended drawings illustrate several novel and different embodiments of the present invention and constructed to function in the most advantageous mode devised for practical application of the basic principles involved in the hereinafter described invention.

Generally speaking, the present invention relates to a device for testing miniature batteries such as those employed in hearing aids. The device has a small electromagnet attached to terminals for battery placement. When contact is made between the battery and the electromagnet, a magnetic field is set up. If the battery is good, a sufficient field will be set up to deflect the pointer. The amount of deflection depends upon the strength of the battery.

Figure 1:
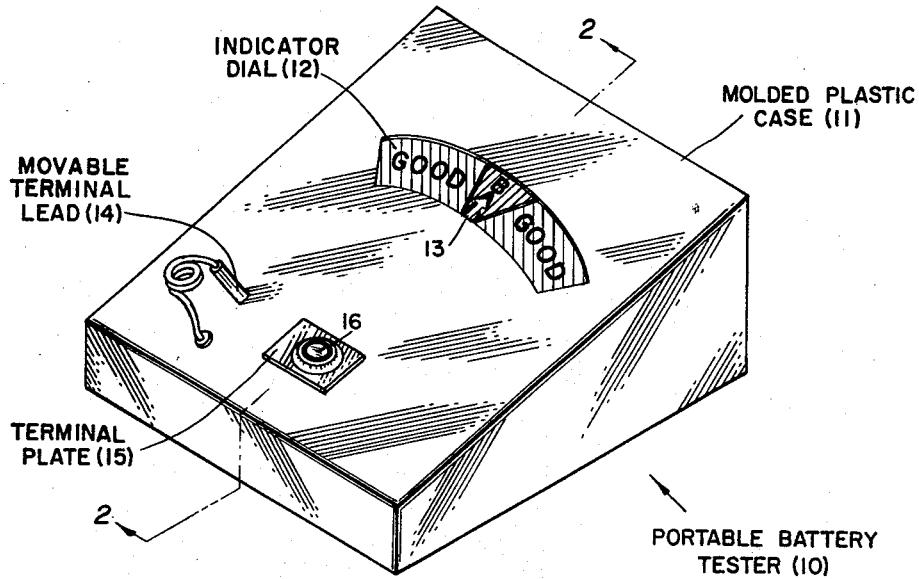
FIGURE 1 is a view in perspective of the portable battery tester.

Referring now to FIGURE 1, portable battery tester 10 has an outer plastic case 11 having an indicator dial 12. Dial 12 is divided into three sections with indicia designated as Good, Bad and Good. Indicator dial 12 has integrated therein an indicating needle 13. Battery 16 is positioned on terminal plate 15 and an electrical connection is made with movable terminal lead 14.

Figure 2:
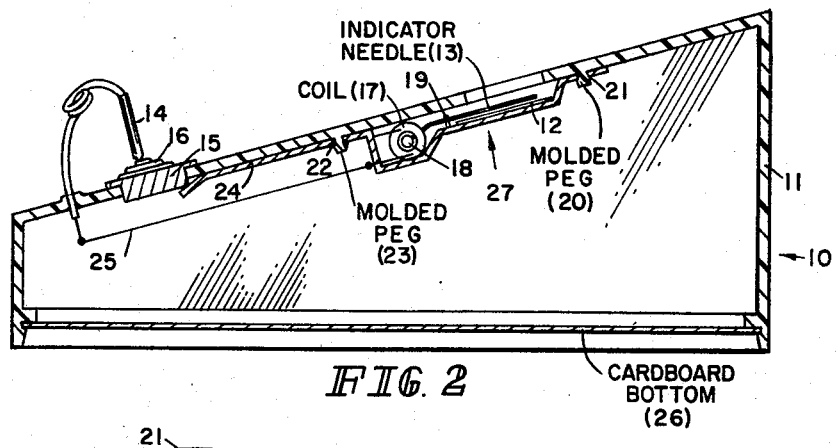
FIGURE 2 is a cross-sectional view taken through 2—2 of FIGURE 1.

FIGURE 2 shows a cross-sectional view of battery tester 10 taken through section 2—2 of FIGURE 1 wherein the operation of tester 10 can be more fully understood. There is in case 11 two pegs 20 and 23 for the placement of voltage indicator unit 27. Unit 27 may be positioned in case 11 by means of snap-in construction or by heat staking. Indicator unit 27 consists of permanent magnet 18 enclosed by a magnetic coil 17. Coil 17 is connected to terminal lead 14 by lead 25, and is connected to terminal plate 15 by lead 24. When battery 16 is positioned on terminal plate 15 and contacted by lead 14, current passes through leads 24 and 25 to the magnetic coil 17. This sets up a magnetic field and indicator needle 13 is then deflected by the field. The amount of deflection depends upon the amount of current flowing from battery 16 to coil 17.

Figure 3:
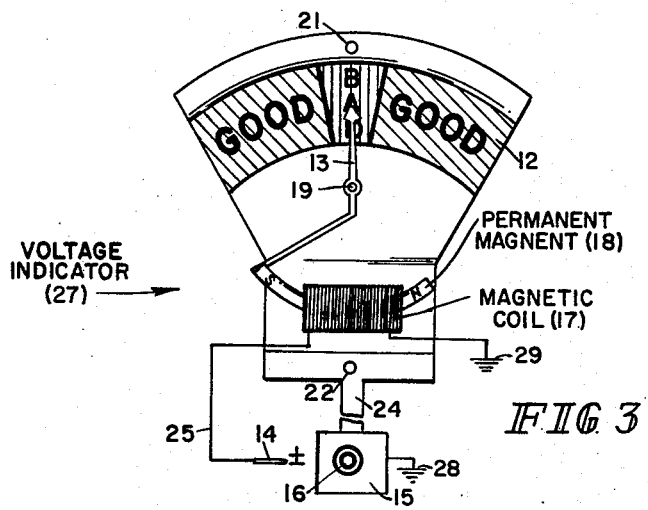
FIGURE 3 is a top view of the voltage indicator apparatus.

FIGURE 3 is a top view of voltage indicator unit 27. Apertures 21 and 22 are for positioning of unit 27 into case 11 (FIGURE 2) on pegs 20 and 23. Battery 16 is positioned on terminal plate 15 and contacted by terminal 14. Terminal plate 15 is connected to magnetic coil 17 by lead plate 24, and terminal 14 is connected to magnetic coil 16 by lead 25. The unit is non-polar—that is, it does not matter how the battery is positioned. Magnetic coil 17 surrounds permanent magnet 18 and when current flows and a magnetic field is established, indicator needle 13 is deflected by the magnetic field and the quality of the battery may be read on indicator dial 12. Voltage indicator is grounded at points 28 and 29.

The invention describes a simple, economical device for testing miniature batteries which may be carried around or readily stored. It operates on the principle of deflection of a needle by an electromagnetic field.

While the invention is illustrated and described in its preferred embodiments, it will be understood that modifications and variations may be effected without departing from the scope of the novel concepts of this invention.

Having thus described my invention, I claim:

1. A battery tester apparatus comprising, in combination, an insulative casing including first means adapted to couple a first side of a battery to ground, second means adapted to connect to a second side of said battery, a conductive lead plate attached to the undersurface of said insulative casing, an electrically conductive coil means supported by said conductive lead plate, said conductive lead plate coupled between said second means and said coil means, movable arm means including permanent magnet means positioned within said coil means such that current flow from said battery through said coil means deflects said arm means proportional to current flow in said coil means, said movable arm means pivotable about a pivot means supported by said conductive lead plate and removed from said coil, and means coupled to said movable arm means to register the voltage of said battery.

2. An apparatus according to claim 1, wherein the means coupled to said movable arm means to register the voltage of said battery includes a pointer and dial underlying said pointer.

3. An apparatus according to claim 1, wherein the second means adapted to connect to a second side of said battery is a movable terminal lead.

4. An apparatus according to claim 1, wherein said insulative case is a molded plastic case.

5. An apparatus according to claim 1, wherein said permanent magnet means is curved and is arcuately displaceable within said coil means.

6. A portable battery tester comprising, in combination, an insulative casing adapted to support a first and second electrode means, said first and second electrode means adapted to connect to a respective terminal of a battery, said first electrode means being mounted in a first aperture contained on the surface of the insulative casing, said second electrode means comprising a probe contact, said probe contact being electrically and physically connected at one end by a flexible wire cord, said wire cord being fixedly attached through a second aperture in said insulative casing, a conductive lead plate attached to the undersurface of said insulative casing, an electrical measuring instrument mounted on said support structure, said measuring instrument comprising a magnetic coil having an input and an output terminal, one of said terminals being connected to said second electrode, while the other of said terminals is electrically connected to said conductive support means, said conductive support means being in electrical contact with said first electrode means to provide a complete circuit with said magnetic coil when a battery is inserted between said first and second electrode means, said measuring instrument further comprising a movable permanent magnet having an indicator arm attached thereto, said movable permanent magnet and said indicator arm being pivotally mounted on said conductive support wherein said permanent magnet is adjacent to said magnetic coil.

References Cited

UNITED STATES PATENTS

| | | | |
|---|---|---|---|
| 435,550 | 9/1890 | Walker | 324—145 |
| 1,705,158 | 3/1929 | McCoy | 324—145 X |
| 2,673,958 | 3/1954 | Banus | 324—149 |

FOREIGN PATENTS 10,277   1895   Great Britain.

RUDOLPH V. ROLINEC, Primary Examiner

C. F. ROBERTS, Assistant Examiner

U.S. Cl. X.R.

324—29.5, 149, 156